Patented Feb. 27, 1934

1,948,891

UNITED STATES PATENT OFFICE 1,948,891

PROCESS FOR THE MANUFACTURE OF ORGANIC COMPOUNDS FROM ORGANIC COMPOUNDS HAVING ONE OR MORE DOUBLE BONDS IN THE MOLECULE

Adrianus Johannes van Peski, Amsterdam, Netherlands, assignor to Naamlooze Vennootschap De Bataafsche Petroleum Maatschappij, The Hague, Netherlands No Drawing. Application July 23, 1930, Serial No. 470,248. In Great Britain August 6, 1929

15 Claims. (Cl. 260—153)

My invention relates to a process for the manufacture of organic compounds from organic compounds having one or more double bonds in the molecule.

In my application No. 371,711, filed June 17, 1929, a process has been described and claimed for absorbing olefines such as ethylene and/or its homologues and/or their polymerization products in suitable strong acids, such as sulphuric acid, phosphoric acid, organic sulphonic acids and the like in the presence of certain catalysts specified therein, for the purpose of converting the olefine etc. into the corresponding alcohols, esters, ethers, etc.

In my application No. 454,197, filed May 20, 1930, an improved method of absorbing ethylene or gases containing ethylene and/or other olefines in strong acids employing as catalysts one or more of the metals or the compounds of the platinum group in finely divided condition, and preferably brought on to a carrier or compounds of the metals of the platinum group or compounds of copper, iron, cobalt or nickel in a soluble form, is described and claimed while in my application No. 453,404, filed May 17, 1930, an improved method of absorbing olefine having three or more carbon atoms and one or more double bonds in the molecule and/or their polymerization products in strong acids employing as catalysts iron, copper, cobalt, nickel, or metals of the platinum group or compounds of any of the aforesaid metals in a soluble form, is described and claimed.

According to my invention it has now been found that the olefines of the above-mentioned kinds may be absorbed in or combined with inorganic or organic acids other than those specified in the aforesaid applications in the presence of catalysts described in the aforesaid earlier applications. Thus for instance, they may be absorbed in or combined with strong organic acids such as oxalic acid, acetic acid or formic acid. By passing the olefines into acids such as the aforesaid, the corresponding esters are formed direct, which is very advantageous compared with the known method, wherein the olefine has first to be combined with sulphuric acid and then the sulphuric ester formed has to be converted into the corresponding acetate, oxalate, etc.

According to my invention it has also been found that not only olefines, but in general all organic substances having one or more double bonds in the molecule may be converted into other compounds by absorbing them in suitable inorganic or organic acids or mixtures thereof in the presence of the above-mentioned catalysts.

As substances which may be treated according to this invention, the following may be quoted by way of example: cyclic hydrocarbons having one or more double bonds in a non-aromatic nucleous or cyclic hydrocarbons with an aliphatic side chain having one or more double bonds in the side chain, unsaturated organic acids, alcohols, ketones, aldehydes, amines, nitriles, etc.

The following example will illustrate how the process may be carried into effect:

Cyclohexene ($C_6H_{10}$) is stirred into 80% sulphuric acid, in which a small quantity of ferrocyanic acid is present. After hydrolyzing the sulphuric ester formed, cyclohexanol ($C_6H_{11}OH$) is obtained in practically theoretical yields.

The process of my invention may be applied to gases such as natural gas, "cracked" gas or the like which contain organic substances having one or more carbon atoms and containing one or more double bonds in the molecule.

What I claim is:

1. A process of absorbing cyclic hydrocarbons having at least one double bond in a non-aromatic nucleus in strong acids, in the presence of a catalyst comprising at least one metal of group VIII of the periodic system.

2. A process as set forth in claim 1, wherein the catalyst comprises at least one metal of group VIII of the periodic system in finely divided form.

3. A process as set forth in claim 1, wherein the catalyst comprises a compound of the metal of group VIII of the periodic system in soluble form.

4. A process as set forth in claim 1, wherein the catalyst comprises at least one metal of the platinum group.

5. A process as set forth in claim 1, wherein the catalyst comprises at least one metal of the iron group.

6. A process as set forth in claim 1, wherein the catalyst comprises a soluble compound of a metal of the iron group.

7. A process as set forth in claim 1, wherein the catalyst comprises a compound of the iron group which is soluble in the strong acids.

8. A process as set forth in claim 1, wherein the catalyst comprises a compound of the platinum group which is soluble in the strong acids.

9. A process as set forth in claim 1, wherein the catalyst comprises a complex cyano compound of a metal of group VIII of the periodic system.

10. A process as set forth in claim 1, wherein cyclohexene is absorbed in strong sulphuric acid in the presence of a compound of a metal of group VIII of the periodic system.

11. A process as set forth in claim 1, wherein cyclohexene is absorbed in strong sulphuric acid in the presence of a metal of group VIII of the periodic system.

12. A process as set forth in claim 1, wherein cyclohexene is absorbed in strong sulphuric acid in the presence of a metal of the platinum group.

13. A process as set forth in claim 1, wherein cyclohexene is absorbed in strong sulphuric acid in the presence of a metal of the iron group.

14. A process as set forth in claim 1, wherein cyclohexene is absorbed in strong sulphuric acid in the presence of a metal of group VIII of the periodic system in finely divided form.

15. A process as set forth in claim 1 wherein the initial hydrocarbons have an aliphatic side chain containing at least one double bond.

ADRIANUS JOHANNES van PESKI.